United States Patent [19]

Hashizume et al.

[11] Patent Number: 5,107,386
[45] Date of Patent: Apr. 21, 1992

[54] MAGNETIC TAPE CASSETTE

[75] Inventors: Kenji Hashizume; Masatoshi Okamura; Haruo Shiba, all of Nagano, Japan

[73] Assignee: TDK Corporation, Tokyo, Japan

[21] Appl. No.: 517,734

[22] Filed: May 2, 1990

[30] Foreign Application Priority Data

May 2, 1989 [JP] Japan .................................. 1-112174

[51] Int. Cl.⁵ .......................................... G11B 23/02
[52] U.S. Cl. ..................................... 360/132; 242/199
[58] Field of Search ................. 360/132; 242/197-199

[56] References Cited

U.S. PATENT DOCUMENTS

4,556,153  12/1985  Takagi et al. ...................... 242/199
4,771,352   9/1988  Watanabe et al. .................. 360/132
4,973,012  11/1990  Hashizume et al. ............. 360/132 X Primary Examiner—John H. Wolff
Attorney, Agent, or Firm—Oblon, Spivak, McClelland, Maier & Neustadt

[57] ABSTRACT

A magnetic tape cassette capable of positively and rapidly accomplishing the lock release operation irrespective of the direction of force applied to a lock release mechanism to open a front lid. The cassette includes a lock lever regulating mechanism for regulating movement of a lock lever to permit it to be pivotally moved in a direction perpendicular to the longitudinal direction thereof about a holding section of a projection of the lever. The holding section is formed at a position downward apart from the projection and vertically opposite to a lock pawl engaged with the front lid with the projection being interposed therebetween. The lock lever regulating mechanism is constituted by a combination of a position regulating rib provided at the casing and a guide groove formed at the lock lever.

7 Claims, 9 Drawing Sheets

FIG. 11B ness of the cassette.

MAGNETIC TAPE CASSETTE

BACKGROUND OF THE INVENTION

This invention relates to a magnetic tape cassette used for a video tape recorder or the like, and more particularly to a magnetic tape cassette including an openable dust cover or front lid for covering the front portion of a cassette casing to protect a magnetic tape when it is out of use.

A magnetic tape cassette which has been conventionally used for a cassette driving device such as a video tape recorder or the like typically includes a front lid openably arranged at the front portion of a casing so as to serve as a dust cover for covering a front opening formed at the front portion of the casing when it is out of use, resulting in preventing entry of dust through the opening into the casing, damage of a magnetic tape and the like.

Now, such a conventional magnetic tape cassette will be described hereinafter with reference to FIGS. 1A to 1G.

Figure 1A:
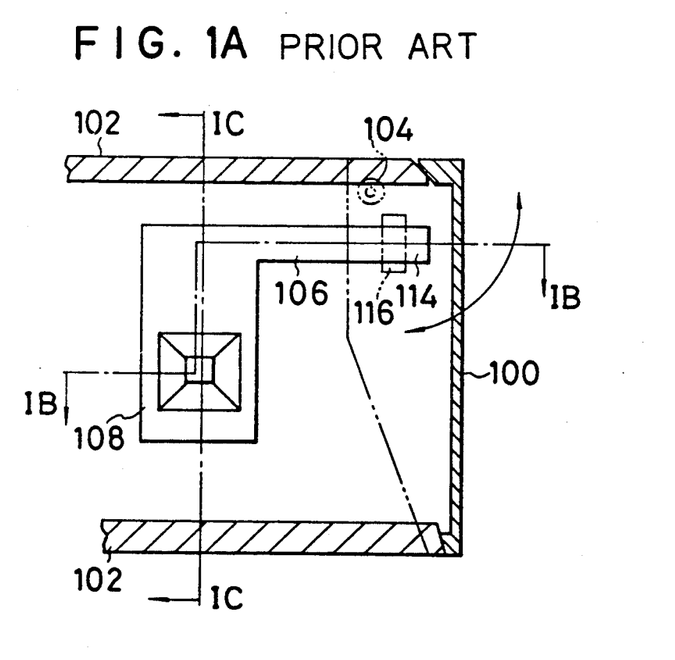
FIG. 1A is a fragmentary side elevation view in section showing an essential part of the conventional magnetic tape cassette.
Figure 1B:
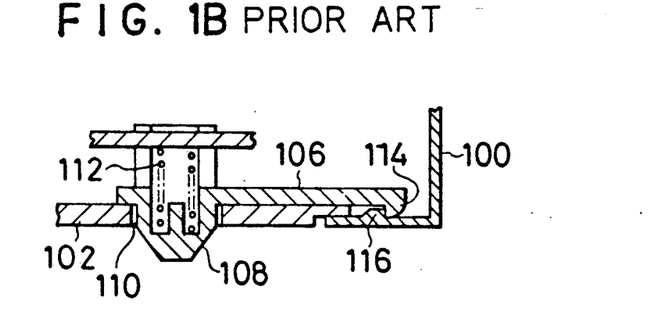
FIG. 1B is a sectional view taken along line IB—IB of FIG. 1A.
Figure 1C:
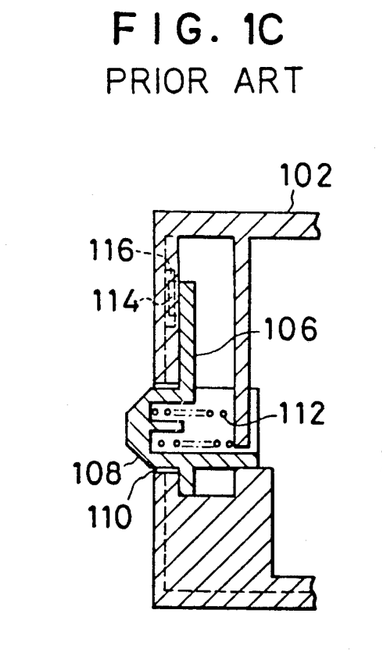
FIG. 1C is a sectional view taken along line IC—IC of FIG. 1A, and FIGS. 1D to 1F each are a fragmentary sectional view showing the manner of operation of a lock lever.

The conventional magnetic tape cassette, as shown in FIGS. 1A to 1C, includes a front lid 100 pivotally mounted on the front portion of a casing 102 through support pins 104 so as to be pivotally moved about the pins 104 and constantly biased in the direction of opening the front lid 100 covering an opening formed at the front portion of the casing 102 by means of a bias member (not shown). The cassette also includes a lock lever 106 which is arranged in the casing 102 and adapted to be engaged with the front lid 100 to shut the opening of the casing 102. The lock lever 106 includes a push button or projection 108 projectably fitted in an aperture or through-hole 110 of the casing 102 and constantly biased in the direction of outward projecting from the casing 102 by means of a spring 112 arranged in the casing 102 and a lock pawl 114 adapted to be engaged with a stopper 116 provided on the inside of the front lid 100 to keep the front opening of the casing 102 closed with the front lid 100 when the cassette is out of use.

Figure 1D:
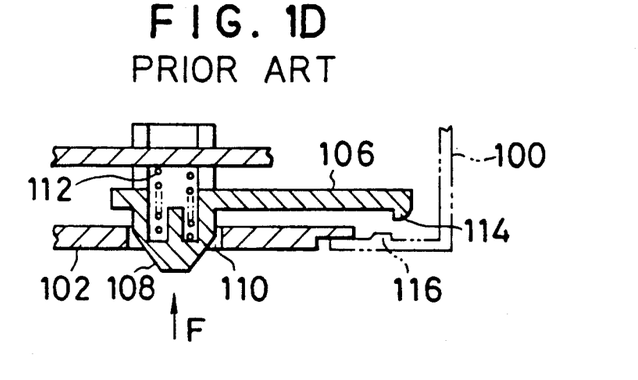

When opening the front lid 100, force F, as shown in FIG. 1D, is applied to the center of the projection 108 to inward push the projection 108 in the axial direction thereof, resulting in the lock lever 106 being inwardly pushed while it is desired to keep it parallel to the casing 102. This leads to disengagement of the lock pawl 114 of the lock lever 106 from the stopper 116 of the front lid 100, to thereby permit the front lid 100 to be ready to be opened by means of an opening mechanism of a cassette driving device such as a video tape recorder or the like.

Figure 1E:
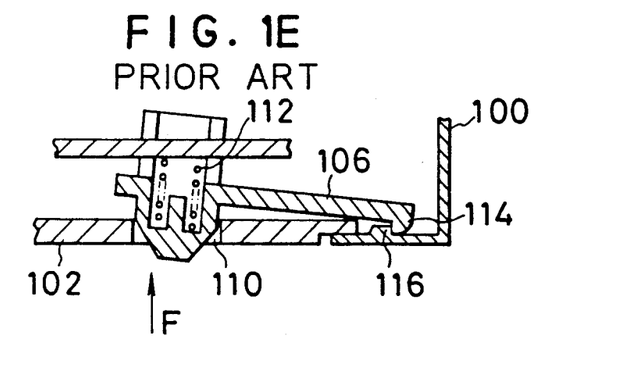
Figure 1F:
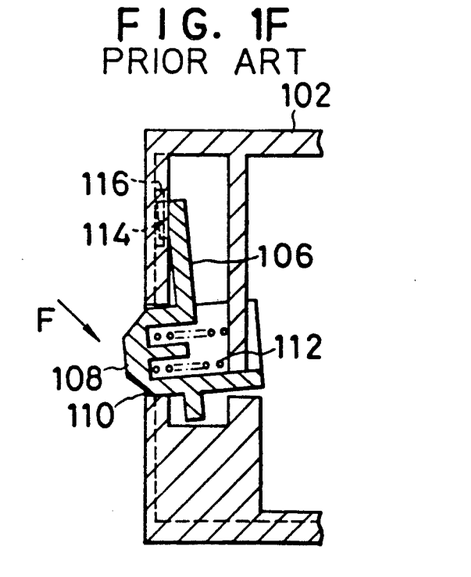
Figure 2:
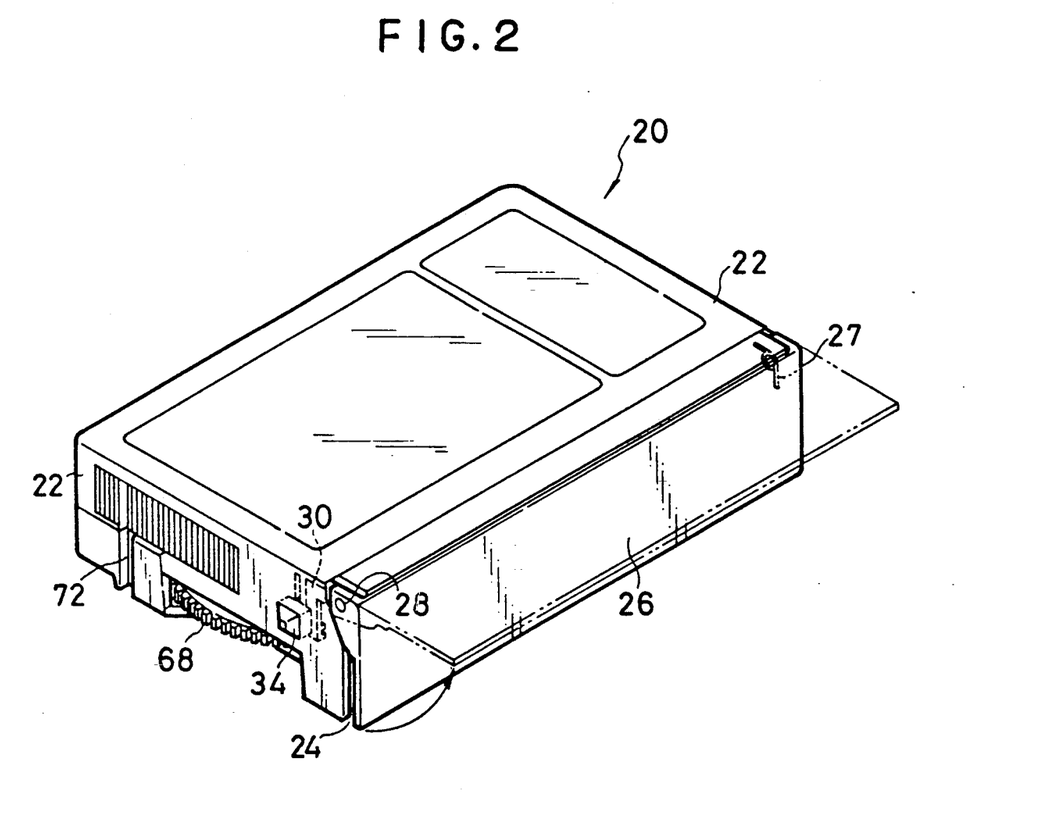
FIG. 2 is a perspective view showing an embodiment of a magnetic tape cassette according to the present invention.
Figure 3:
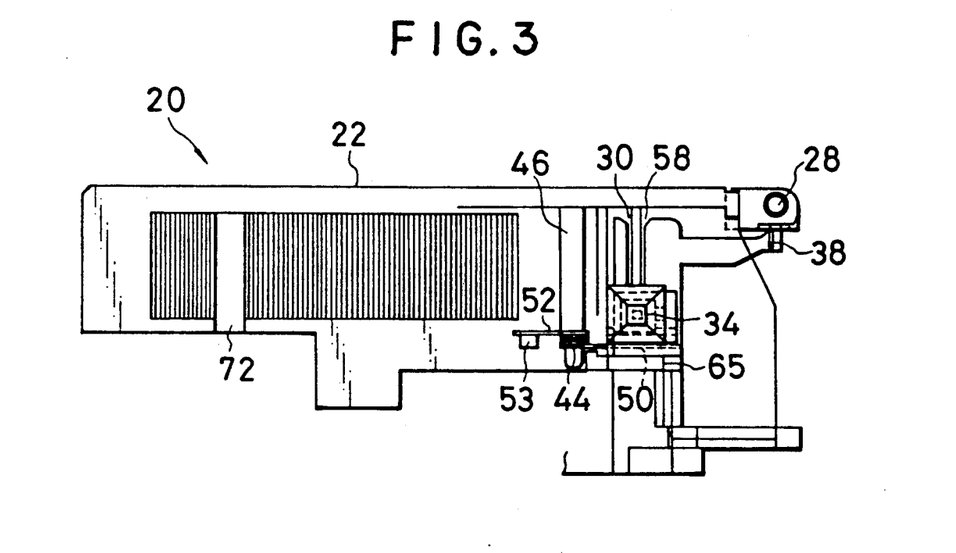
FIG. 3 is a fragmentary side elevation view of the magnetic tape cassette shown in FIG. 2.
Figure 4:
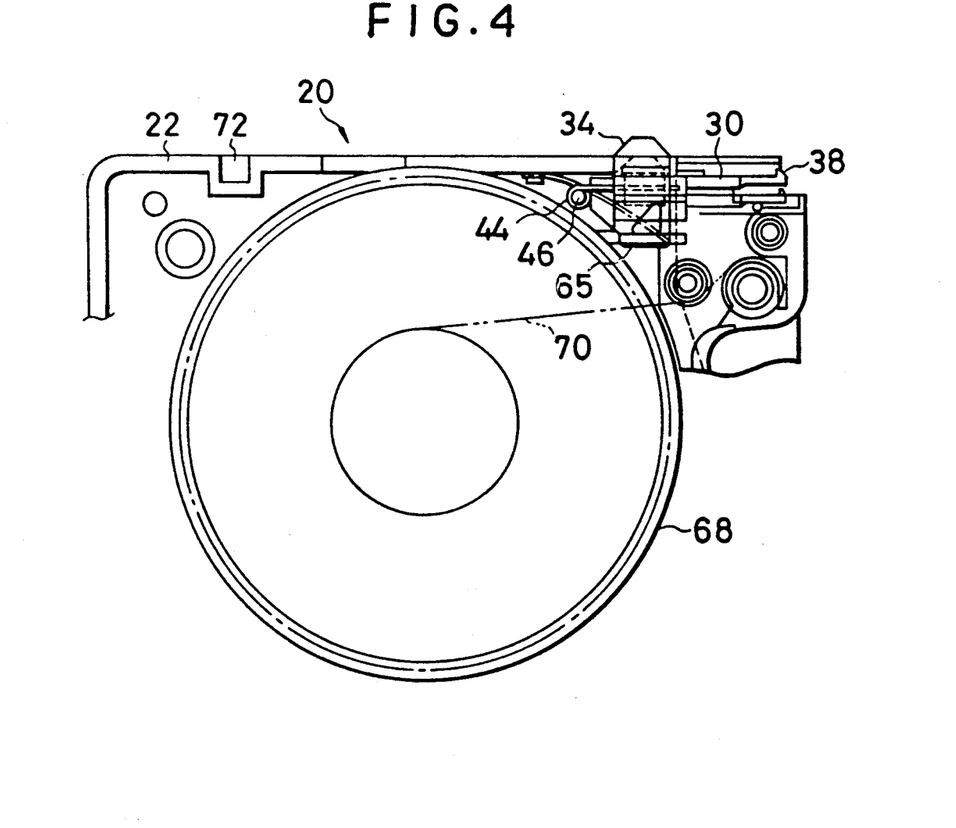
FIG. 4 is a fragmentary bottom view of FIG. 3.
Figure 5:
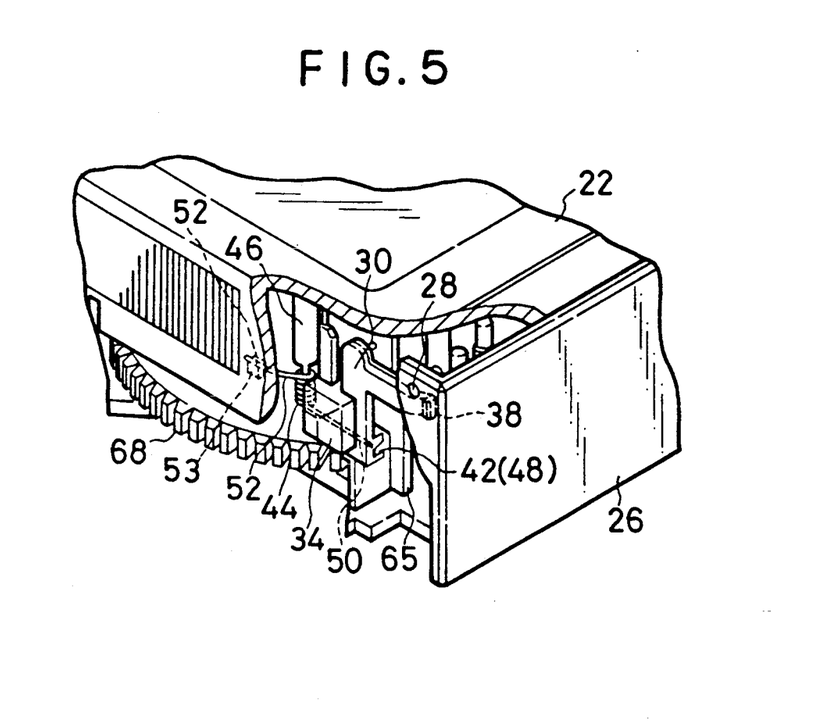
FIG. 5 is a partially cutaway fragmentary perspective view showing an essential part of the magnetic tape cassette shown in FIG. 2.
Figure 6:
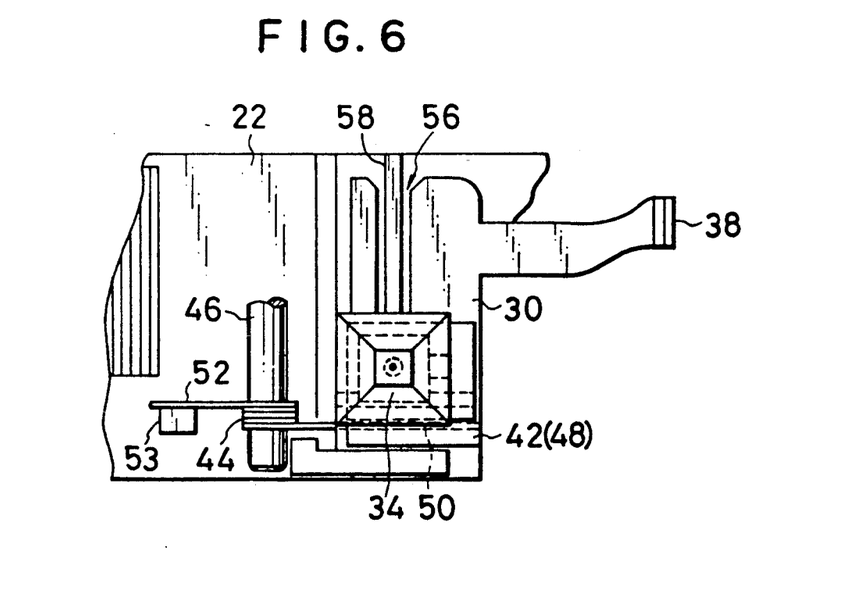
FIG. 6 is a fragmentary side elevation view of the essential part shown in FIG. 5.
Figure 7:
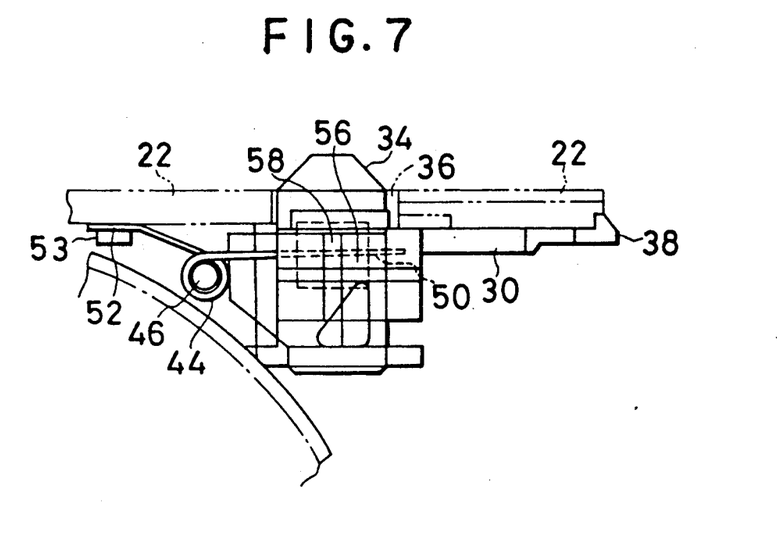
FIG. 7 is a fragmentary bottom view of the essential part shown in FIG. 5.
Figure 8:
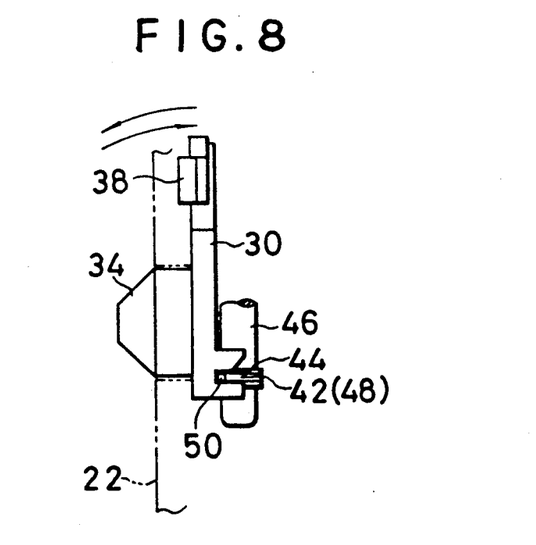
FIG. 8 is a fragmentary schematic side elevation view of the essential part shown in FIG. 5.

Unfortunately, in the conventional magnetic tape cassette constructed as described above, the spring 112 is arranged at the same position as the projection 108 or on the rear side of the projection 108 in a manner to be substantially coaxial with the projection 108, as shown in FIGS. 1B and 1C. Accordingly, when the opening mechanism of the cassette driving device inward pushes the projection 108, it often applies force F to the projection 108 while deviating from the center of the projection 108 or in a manner to be directed obliquely with respect to the axial direction of the projection 108, so that the force deviates from the axis of the spring 112 to cause it to be compressed in a wrong posture. This causes the projection 108 to be forced into the casing 100 in a wrong posture as shown in FIG. 1E or 1F, to thereby fail to release the lock pawl 114 from the stopper 116. This fails to properly operate the front lid 100 and often leads to damage of the cassette.

Accordingly, it would be highly desirable to develop a magnetic tape cassette which is capable of safely and positively accomplishing rapid release of a front lid from a casing when it is desired to open the front lid.

SUMMARY OF THE INVENTION

Generally speaking, in accordance with the present invention, a magnetic tape cassette is provided. The magnetic tape cassette includes a casing, a magnetic tape arranged in the casing so as to be stretched at the front portion of the casing, a front lid openably arranged at the front portion of the casing to selectively cover the magnetic tape stretched, a bias member arranged in the casing so as to constantly bias the front lid in a direction of shutting the front lid, a lock lever arranged so as to selectively keep the front lid closed and a spring engaged with the lock lever. The lock lever includes a projection outward projectable from the casing, a lock pawl engaged with the front lid to keep the front lid closed and released from the engagement with the front lid when the projection is inward pushed and a holding section with which the spring is engaged to constantly force the projection outward of the casing and about which the lock lever is pivotally moved. The magnetic tape cassette also includes lock lever regulating means for regulating movement of the lock lever to permit the lock lever to be pivotally moved in a predetermined direction about the holding section of the projection. The holding section of the lock lever is formed at a position apart from the projection and opposite to the lock pawl with the projection being interposed therebetween.

In a preferred embodiment of the present invention, the predetermined direction in which the lock lever is pivotally moved is perpendicular to the longitudinal direction of the lock lever. The lock lever regulating means may comprise a combination of a position regulating rib provided at the casing and a guide groove formed at the lock lever.

Alternatively, in a preferred embodiment of the present invention, the casing is formed with a through-hole in which the projection is loosely fitted in a manner to be projectable via the through-hole, and the lock lever regulating means comprises a combination of the projection and the through-hole of the casing.

Alternatively, in a preferred embodiment of the present invention, the holding section comprises a groove formed on the lock lever so as to extend in the longitudinal direction of the lock lever, the spring includes one end loosely fitted in the groove of the lock lever, and the lock lever regulating means comprises a combination of the one end of the spring and groove of the lock lever.

Accordingly, it is an object of the present invention to provide a magnetic tape cassette which is capable of rapidly ensuring safe and positive operation of the cassette.

It is another object of the present invention to provide a magnetic tape cassette which is capable of positively and rapidly carrying out the lock release operation required for opening a front lid.

It is a further object of the present invention to provide a magnetic tape cassette which is capable of effectively accomplishing the lock release operation irrespective of the direction of force applied to a lock release mechanism.

It is still another object of the present invention to provide a magnetic tape cassette which is capable of accomplishing the above-described objects with a simple structure.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings; wherein:

FIGS. 1A to 1F each show a conventional magnetic tape cassette, wherein

DETAILED DESCRIPTION OF THE PREFERRED EMBODIMENT

Now, a magnetic tape cassette according to the present invention will be described hereinafter with reference to FIGS. 2 to 12, wherein like reference numerals designate like or corresponding parts throughout.

FIGS. 2 to 8 show an embodiment of a magnetic tape cassette according to the present invention. A magnetic tape cassette of the illustrated embodiment, which is generally designated at reference numeral 20, includes a casing 22 formed at the front portion thereof with an opening 24 and a front lid 26 pivotally mounted on the front portion of the casing 22 through support pins 28 so as to selectively close the opening 24. On the front lid 26 acts a bias member or spring 27 so as to constantly bias the front lid 26 in the direction of closing the opening 24. The magnetic tape cassette 20 also includes a lock lever 30 arranged in the casing 22 so as to extend along one side of the casing. The lock lever 30 is provided at the rear portion thereof with a push button or projection 34 in a manner to outward extend therefrom and loosely fitted in a through-hole 36 formed on the one side of the casing 22 so as to be outward projectable via the through-hole 36 from the casing 22. In the illustrated embodiment, the projection 34 and through-hole 36 each are formed into a rectangular shape and the projection 34 is positioned in a manner to downward deviate from the longitudinal axis of the lock lever 30. Also, the lock lever 30 is provided at the front or distal end thereof with a lock pawl 38 and the front lid 26 is provided on the inner surface thereof with a stopper 40 in a manner to positionally correspond to the lock pawl 38. The lock pawl 38 is holdingly engaged with the stopper 40 to keep the opening 24 of the casing 22 closed with the front lid 26 when the cassette 20 is out of use. Also, the lock lever 30 is provided with a holding section 42 about which the lock lever is pivotally moved in a predetermined direction. The holding section 42 is arranged at a position apart from the projection 34 and opposite to the lock pawl 38 with the projection 34 being interposed between the holding section 42 and the lock pawl 38. In the illustrated embodiment, the holding section 42 is arranged in a manner to downward deviate from the projection; thus, the lock pawl 38, projection 34 and holding section 42 are arranged in order from above. Alternatively, the holding section 42 may be arranged so as to laterally deviate from the projection. In this instance, the holding section is located on the side laterally opposite to the lock pawl 38 with the projection being interposed therebetween.

The cassette of the illustrated embodiment further includes a spring 44 which is engaged through the holding section 42 with the lock lever 30 to constantly urge the lock lever 30 in the direction of causing the projection 34 to be outward projected via the through-hole 36 of the casing 22. In the illustrated embodiment, the holding section 42 comprises a groove 48 formed on the rear surface of the portion of the lock lever 30 below the projection 34 in a manner to laterally extend in the longitudinal direction of the lock lever 30, and the spring 44 comprises a coiled spring which is vertically fitted on a pin 46 vertically mounted in the casing 22 and of which both ends 50 and 52 extend in directions laterally opposite to each other. The one end portion 50 of the spring 44 is loosely fitted by a length in the groove 48 of the lock lever 30. The other end 52 of the coiled spring 44 is supportedly abutted against a holder 53 mounted on the inner surface of the casing 22.

Further, the magnetic tape cassette includes lock lever regulating means for regulating movement of the lock lever in a manner to permit the lock lever to be pivotally moved about the holding section 42 in the above-described predetermined direction. In the illustrated embodiment, as will be noted from the foregoing, the above-described predetermined direction is defined parallel with or along the central axis 54 of the projection 34. For this purpose, in the illustrated embodiment, the lock lever 30 is formed with a guide groove 56 so as to downward extend by a suitable distance from the portion of the upper edge of the lock lever 30 positioned above the projection 34 and the casing 22 is provided with a position regulating rib 58, which is formed in a manner to correspond in position and configuration to the guide groove 56 so that it may be loosely fitted in the guide groove 56. In the illustrated embodiment, the position regulating rib 58 is formed into a plate like-shape downward extending from the upper surface of the casing 22 and terminating above the projection 34, and having a width in the direction perpendicular to the longitudinal direction of the lock lever 30, so that it may be loosely fitted in the guide groove 56 in a manner to be perpendicular to the longitudinal axis of the lock lever 30. Such arrangement of the lock lever regulating means constructed as described above permits the lock lever 30 to be stably pivotally moved about the holding section 42 or the one end 50 of the spring 44 in the direction perpendicular to the longitudinal direction of the lock lever 30 or in the direction parallel with the central axis of the projection 34 while substantially preventing the lock lever from being pivotally moved in the longitudinal direction of the lock lever 30 or in the clockwise or counterclockwise direction in FIGS. 3 and 6, when the projection is inwardly pushed to inward move the lock lever for the purpose of releasing the lock pawl 38 from the stopper 40 of the front lid 26 to open the front lid 26. Such pivotal movement of the lock lever 30 is prevented due to the fact that the surface portion of the lock lever 30 defining the guide groove 56 abuts against the position regulating rib 58. Thus, in the illustrated embodiment, the lock lever regulating means comprises a combination of the position regulating rib 58 and the guide groove 56 and the above-described predetermined direction in which the lock lever is pivotally moved is defined as the direction perpendicular to the longitudinal direction of the lock lever 30.

In the illustrated embodiment, the lock lever regulating means may be constructed without arranging the above-described guide groove 56 and position regulating rib 58. More particularly, as described above, the groove 48 acting as the holding section 42 is formed on the lock lever so as to be downward apart from the projection 34 and extend in the longitudinal direction of the lock lever 30 and the one end 50 of the spring 44 is loosely fitted by a length in the groove 48. Thus, it will be readily noted that a combination of the so-arranged spring 44 and groove 48 likewise permits the above-described pivotal movement of the lock lever 30 about the holding section 42 in the direction perpendicular to the longitudinal direction of the lock lever 30 while substantially preventing the pivotal movement of the lock lever 30 in the longitudinal direction of the lock lever 30. Alternatively, in the illustrated embodiment, the lock lever regulating means may be formed by a combination of the projection 34 and the through-hole 36. More particularly, the projection 34 is formed into a rectangular shape and loosely fitted in the through-hole 36 of the casing 22 likewise formed into a rectangular shape in a manner to be projectable via the through-hole 36 from the casing, so that when the lock lever 30 is to be pivotally moved in the longitudinal direction thereof, the projection 34 is abutted at the side portion thereof against the side portion of the inner surface of the through-hole 36, to thereby substantially prevent the pivotal movement of the lock lever in the longitudinal direction of the lock lever. In this instance, it is preferable that a gap 60 defined between the inner surface 62 of the through-hole 36 and the peripheral surface 64 of the projection 34 is so formed that the upper and lower portions of the gap 60 is larger than the both side portions of the gap 60. The formation of the gap 60 in such a manner more effectively prevents the pivotal movement of the lock lever in the longitudinal direction thereof while ensuring smooth movement of the projection in the axial direction thereof.

Alternatively, the lock lever regulating means may comprise the combination of the guide groove 56 and position regulating rib 58, the combination of the through-hole 36 and projection 34, and the combination of the one end 50 of the spring 44 and the groove 48 of the lock lever.

In the drawings, reference numerals 65 and 66 each designate a partition provided on the inner surface of the casing 22, 68 is a reel, 70 is a magnetic tape, and 72 is a guide recess formed on the outer surface of the casing 22.

Now, the manner of operation of the magnetic tape cassette of the illustrated embodiment constructed as described above will be described hereinafter with reference to FIGS. 9A to 12 as well as FIG. 2 to 8.

Figure 9A:
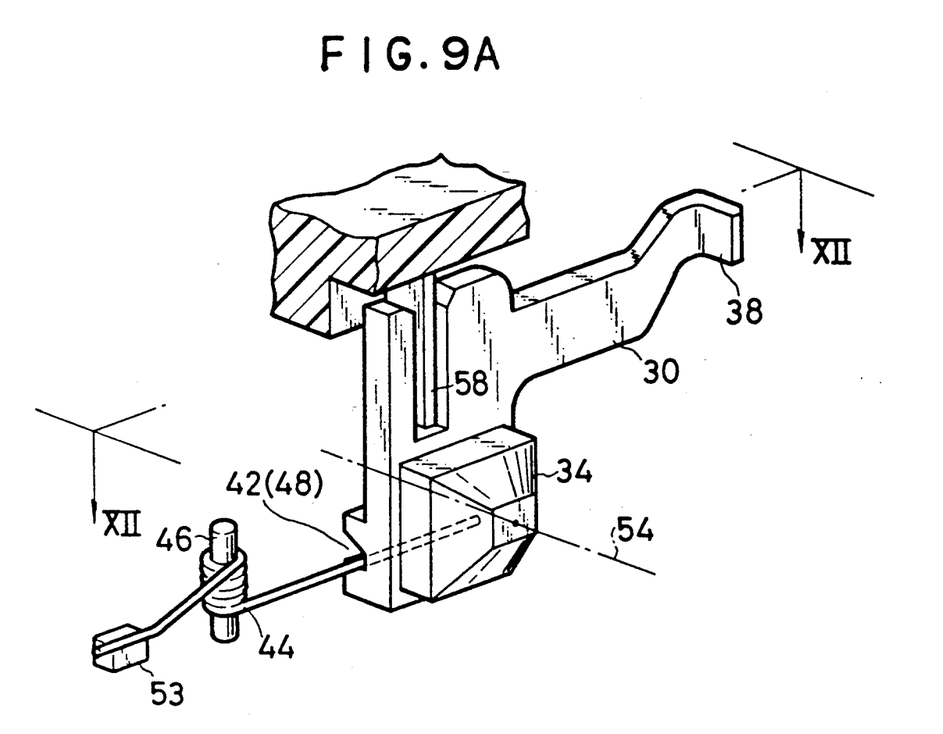
FIG. 9A is a fragmentary perspective view partly in section showing a lock lever before it is subject to the push operation.
Figure 9B:
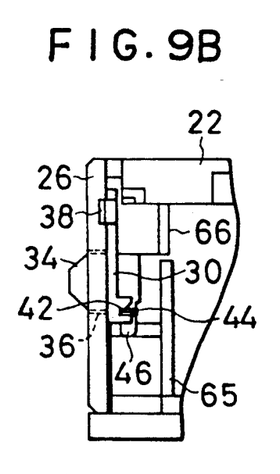
FIG. 9B is a fragmentary side elevation view corresponding to FIG. 9A.
Figure 10A:
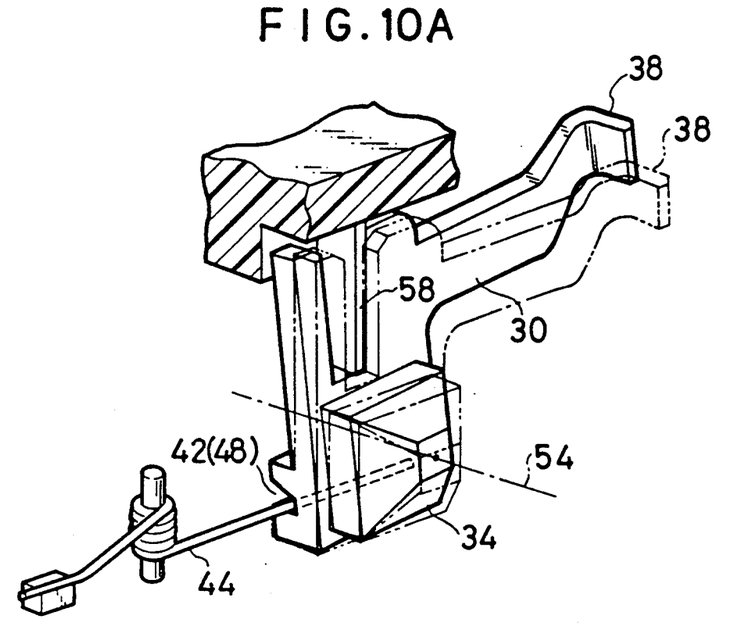
FIG. 10A is a fragmentary perspective view partly in section showing a lock lever which is under the push operation.
Figure 10B:
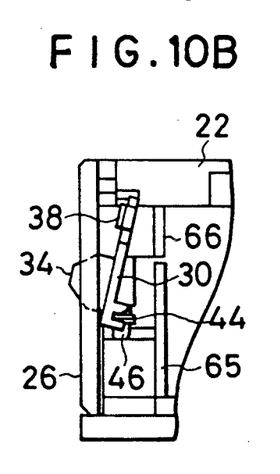
FIG. 10B is a fragmentary side elevation view corresponding to FIG. 10A.
Figure 11A:
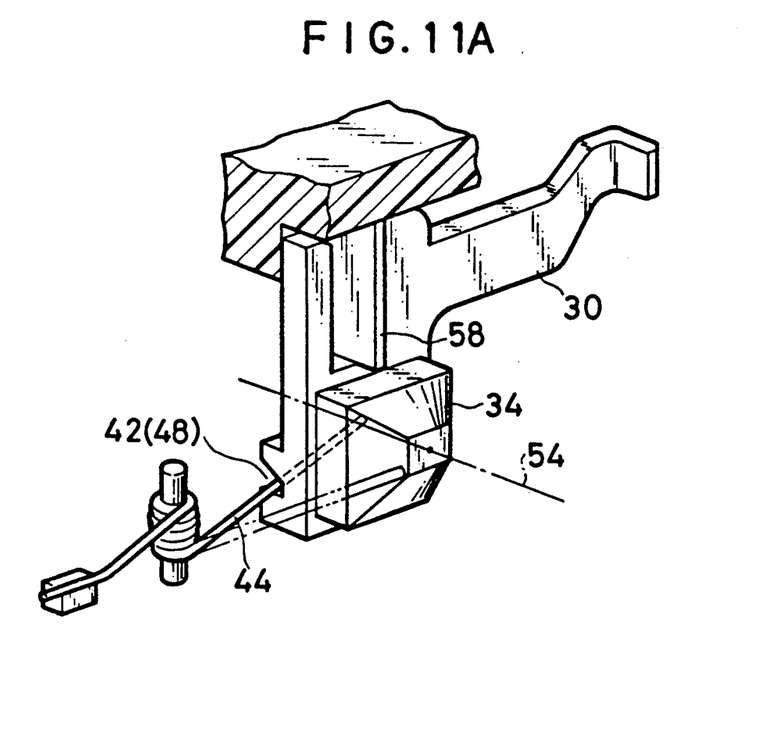
FIG. 11A is a fragmentary perspective view partly in section showing a lock lever fully pushed.
Figure 11B:
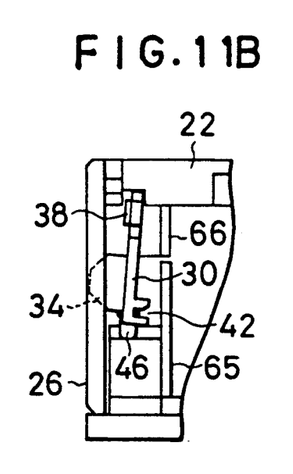
FIG. 11B is a fragmentary fragmentary side elevation view corresponding to FIG. 11A.
Figure 12:
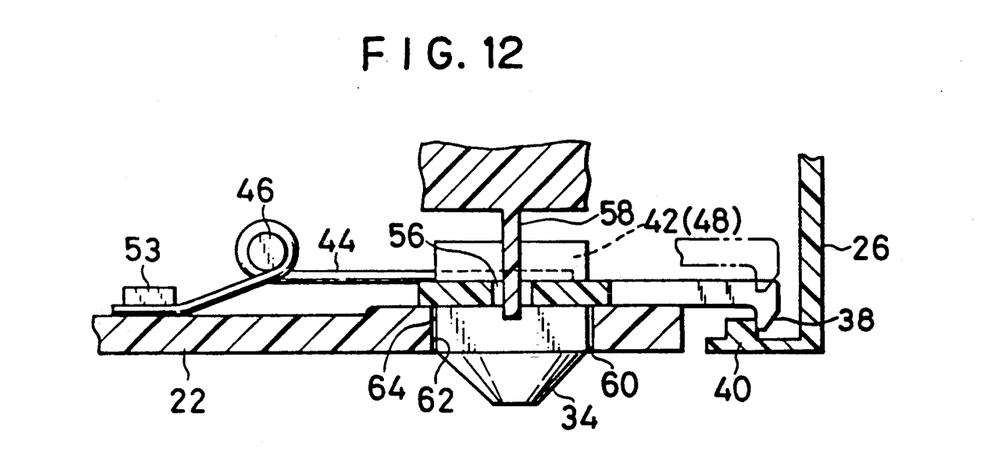
FIG. 12 is a sectional plan view taken along line XII—XII of FIG. 9A.

When the magnetic tape cassette 20 is charged in a cassette driving device such as a video tape recorder, the projection 34 projecting from the casing 22 as shown in FIGS. 9A and 9B is forcedly pushed into the casing against the spring 44 by a projection operating member of the device, so that the lock lever 30 may be pivotally moved about the one end 50 of the spring 44 fitted in the guide groove 56 to inward move the lock pawl 38 as shown in FIGS. 10A and 10B. This causes the lock pawl 38 to be disengaged from the stopper 40 of the front lid 26, resulting in the front lid 26 being rendered open against the bias member 27. Thus, the magnetic tape cassette of the illustrated embodiment permits the lock lever 30 to be positively and rapidly released from the engagement with the front lid 26 without requiring to fully push the projection 34 into the casing 22 as shown in FIGS. 11A and 11B.

As can be seen from the foregoing, the present invention is so constructed that the holding section of the lock lever with which the spring is engaged to constantly force the projection outward of the casing is formed at a position apart from the projection and opposite to the lock pawl based with the projection being interposed therebetween and the lock lever regulating means is arranged so as to regulate movement of said lock lever in a manner to permit the lock lever to be pivotally moved in the predetermined direction about the holding section of the projection. Such construction of the present invention permits the lock lever to be pivotally moved about the holding section in the predetermined direction or the inward direction of the casing when the projection is inward forced against the spring, during which the lock lever regulating means substantially prevents movement of the lock lever in the direction perpendicular to the above-described pivotal movement of the lock lever. Thus, the lock pawl of the lock lever is positively disengaged from of the stopper of the front lid, resulting in opening the front lid.

Further, the projection is positioned apart from the holding section acting as the center of pivotal movement of the lock lever. Thus, the pivotal movement of the lock lever is positively carried out even when force is applied to the projection while deviating from the central axis of the projection. Thus, it will be noted that the magnetic tape cassette of the present invention ensures positive and rapid release of the lock lever from the front lid to open the front lid.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all the generic and specific features of the invention herein described and all statements of the scope of the invention which, as a matter of language, might be said to fall therebetween.

We claim:

1. A magnetic tape cassette comprising:
   a casing;
   a front lid pivotally mounted at a front portion of said casing;
   a bias member arranged in said casing so as to constantly bias said front lid toward a closed position;
   a lock lever having a pawl engageable with said front lid to lock said front lid in said closed position;
   a spring holding section arranged on said lock lever at a position spaced from said pawl;
   a projection arranged on said lock lever at a position intermediate said pawl and said spring holding section;
   a spring engaging with said lock lever at said spring holding section; and
   a lock lever regulating means for regulating movement of said lock lever to guide said lock lever to pivot about said spring holding section in a predetermined direction in response to the application of a force to said projection.

2. A magnetic tape cassette as defined in claim 1, wherein said spring has one end forming a pivot axis about which said lock lever is pivoted in said predetermined direction.

3. A magnetic tape cassette as defined in claim 2, wherein said lock lever regulating means comprises a combination of a position regulating rib provided at said casing and a guide groove formed at said lock lever.

4. A magnetic tape cassette as defined in claim 2, wherein said casing is formed with a through-hole in which said projection is loosely fitted in a manner to be projectable via said through-hole; and
   said lock lever regulating means comprises a combination of said projection and said through-hole of said casing.

5. A magnetic tape cassette as defined in claim 2, wherein said holding section comprises a groove formed on said lock lever so as to extend substantially parallel to said pivot axis;
   said one end of said spring is loosely fitted in said groove of said lock lever; and
   said lock lever regulating means comprises a combination of said one end of said spring and said groove of said lock lever.

6. A magnetic tape cassette comprising:
   a casing;
   a front lid pivotally mounted at a front portion of said casing;
   a bias member arranged in said casing so as to constantly bias said front lid toward a closed position;
   a lock lever having a pawl engageable with said front lid to lock said front lid in said closed position;
   a spring holding section arranged on said lock lever at a position spaced from said pawl;
   a projection arranged on said lock lever at a position intermediate said pawl and said spring holding section;
   a spring engaging said lock lever at said spring holding section; and
   a lock lever regulating means for regulating movement of said lock lever to guide said lock lever to pivot about said spring holding section in a predetermined direction in response to the application of a force to said projection;
   said holding section of said lock lever being formed at a position spaced downward apart from said projection and vertically opposite to said lock pawl with said projection being interposed therebetween; and
   said lock lever regulating means comprising a combination of a position regulating rib provided at said casing and a guide groove formed at said lock lever.

7. A magnetic tape cassette comprising:
   a casing;
   a front lid pivotally mounted at a front portion of said casing;
   a lock lever mounted within said casing having a pawl spaced from a spring holding section and a projection intermediate said pawl and said spring holding section, said projection being accessible from outside said casing through an opening in said casing;
   a spring having a first end received by said spring holding section and a second end abutting said casing; and
   a lock lever regulating means for guiding said lock lever in a pivoting movement about said second end of said spring to ensure disengagement of said pawl from said front lid in response to a force applied to said projection.

* * * * *